United States Patent
Davison et al.

(10) Patent No.: US 10,771,528 B2
(45) Date of Patent: Sep. 8, 2020

(54) COMMON DISTRIBUTION OF AUDIO AND POWER SIGNALS

(71) Applicant: OneView Controls, Inc., Marlborough, MA (US)

(72) Inventors: Ian Ronald Davison, Andover, MA (US); Kenneth Dale Jones, Atkinson, NH (US)

(73) Assignee: OneView Controls, Inc., Marlborough, MA (US)

( * ) Notice: Subject to any disclaimer, the term of this patent is extended or adjusted under 35 U.S.C. 154(b) by 0 days.

(21) Appl. No.: 16/314,657

(22) PCT Filed: Jun. 29, 2017

(86) PCT No.: PCT/US2017/040151
§ 371 (c)(1),
(2) Date: Dec. 31, 2018

(87) PCT Pub. No.: WO2018/005895
PCT Pub. Date: Jan. 4, 2018

(65) Prior Publication Data
US 2019/0319999 A1    Oct. 17, 2019

Related U.S. Application Data

(60) Provisional application No. 62/356,340, filed on Jun. 29, 2016.

(51) Int. Cl.
*H04L 29/06* (2006.01)
*G06F 3/16* (2006.01)

(52) U.S. Cl.
CPC .............. *H04L 65/60* (2013.01); *G06F 3/167* (2013.01); *H04L 29/06027* (2013.01)

(58) Field of Classification Search
CPC ..... H04L 12/2838; H04L 65/60; H03K 17/689; G06F 3/167
USPC ............................... 455/522, 69, 3.01, 67.11
See application file for complete search history.

(56) References Cited

U.S. PATENT DOCUMENTS

| 8,385,561 | B2 * | 2/2013 | Merrey ............... H04B 3/58 381/120 |
| 8,554,133 | B1 | 10/2013 | Feldman et al. |
| 2002/0072816 | A1 * | 6/2002 | Shdema ............. H04L 12/2805 700/94 |

(Continued)

FOREIGN PATENT DOCUMENTS

WO    WO-2015/106992 A1    7/2015

OTHER PUBLICATIONS

International Preliminary Report on Patentability for PCT/US2017/040151 dated Jan. 1, 2019.

(Continued)

*Primary Examiner* — John J Lee
(74) *Attorney, Agent, or Firm* — Foley & Lardner LLP

(57) ABSTRACT

Techniques for implementing an audio distribution system using only standard network cabling for both power transmission and audio signal transmission. The system comprising of one or more Audio-streaming Source Units and one or more self-contained Network-powered Speaker Units where a plurality of audio streams can exist simultaneously and any audio stream can be directed between any Audio-streaming Source Unit and any Network-powered Speaker Unit.

27 Claims, 9 Drawing Sheets

(56) References Cited

U.S. PATENT DOCUMENTS

| | | | |
|---|---|---|---|
| 2002/0123895 A1* | 9/2002 | Potekhin | H04L 12/1813 |
| | | | 704/275 |
| 2003/0236937 A1 | 12/2003 | Barros De Almeida | |
| 2006/0238068 A1 | 10/2006 | May et al. | |
| 2009/0323717 A1* | 12/2009 | Landry | H03K 17/689 |
| | | | 370/463 |
| 2015/0279387 A1 | 10/2015 | List | |
| 2015/0380003 A1 | 12/2015 | Davis et al. | |

OTHER PUBLICATIONS

International Search Report and Written Opinion for PCT Application No. PCT/US17/40151 dated Sep. 14, 2017.

* cited by examiner

COMMON DISTRIBUTION OF AUDIO AND POWER SIGNALS

CROSS RELATED APPLICATION

This application is a National Stage of International Application No. PCT/US2017/40151, entitled "COMMON DISTRIBUTION OF AUDIO AND POWER SIGNALS" filed on Jun. 29, 2017, which in turns claims priority to U.S. Provisional Patent Application No. U.S. 62/356,340 entitled "COMMON DISTRIBUTION OF AUDIO AND POWER SIGNALS" filed Jun. 29, 2016 which are hereby incorporated by reference in their entirety.

TECHNICAL BACKGROUND

This description relates to distribution of audio signals over a packet network and distribution of power over the same network cabling.

BACKGROUND

Systems exist to distribute audio over large indoor and/or outdoor premises, usually from one or more audio sources to a number of audio speakers distributed about the premises. Two different audio distribution systems are in common use.

The most straight-forward system comprises a separate audio amplifier output feeding each speaker directly over standard audio cable. For example, a stereo amplifier with a pair of 8-ohm impedance outputs can directly drive a stereo pair of 8-ohm speakers. For a system with a large number of speakers there might be a separate centrally-located bank of amplifiers for each speaker pair, with audio cabling running to speakers distributed throughout the entire expanse of the premises. Some systems might use an audio matrix switch in front of the bank of amplifiers to allow different speaker zones to receive audio from independently-selectable sources. In this kind of system, high-quality heavy-gauge speaker wire is required. For example, 12 AWG (i.e., American Wire Gauge) high-quality copper wire might be used.

Another system, which is more efficient for premises with longer wire runs, is the constant voltage system. This system is optimized for driving many speakers from a single amplifier output. In a constant voltage system, the amplifier has a transformer output that steps the output voltage up to a high value, e.g., 70 Volts. When the voltage used on the wire runs is increased the current in the wire decreases leading to lower losses. Then each speaker has a step-down transformer to convert back to the appropriate voltage for the desired speaker wattage. A number of speakers, each with its own step-down transformer, can be connected in parallel. Connecting or disconnecting a speaker does not affect the operation of the other parallel-connected speakers. Each speaker can be set for a different wattage by having step-down transformers with different ratios. In this type of system, a lighter-gauge speaker wire may be used, typically between 14 and 18 AWG.

These two types of systems can be mixed together. For example, an audio switching matrix front end might feed combinations of conventional and constant-voltage amplifiers. The conventional amplifiers would feed the shorter wire runs and the constant-voltage amplifiers would feed the longer runs. Each amplifier output comprises one "zone" of the audio distribution system. All of the speakers in a zone would be connected in some series/parallel combination. Speakers in a given zone would always play out the same audio signal.

Another way to transport audio over large premises is to use a packet network such as an Ethernet network. It is common practice to install network cabling throughout a business or large residence. This will typically be standard category 5, 5e, or 6 cabling used in 1000BASE-T Ethernet installations (IEEE 802.3ab). Streaming audio technology, where a server continually transmits digitally-encoded audio over a packet network to one or more receiving clients, is a very mature technology which provides very high quality over typical high-bandwidth networks.

A play-out device that receives audio over a packet network and plays it out to a speaker would typically include at least a streaming audio client, one or more speaker amplifiers, and one or more speakers. A streaming audio client would include at least a power supply, a network interface, some form of digital processor to receive the network packets and assemble them into a sequence of digital audio samples, and a digital to analog converter ("DAC") to create the audio signal that is then provided to one or more speaker amplifiers.

The requirement for a power supply and a network connection would seem to require that two different cables must be run to each streaming audio client. By making use of the IEEE 802.3at Power over Ethernet ("PoE") standard, a device connected to an Ethernet cable can receive up to 25 Watts of DC power and networked audio signals from the same network cable.

With these considerations in mind, we can conceive of an alternative to the conventional ways of distributing audio over large premises comprising of various sources of streaming audio and self-contained play-out devices containing a streaming audio client, speaker amplifier(s) and speaker(s) with the necessary power coming from an 802.3at power conversion module. Each self-contained play-out device is connected to a network cable that is run from a port on an 802.3at capable Ethernet switch.

A system based on conventional audio cabling can only send audio in one direction from an audio source to a play-out device. With networked audio it is possible to include a microphone in the play-out devices and send audio back to a network server.

SUMMARY

In general, this disclosure describes methods of distributing audio over large premises, where each speaker is connected only to standard network cabling such as the standard category 5, 5e or 6 cabling used in 1000BASE-T Ethernet installations (IEEE 802.3ab). This distribution system comprises of one or more self-contained Network-powered Speaker Units ("NSU"), each including at least a streaming audio client, one or more speaker amplifiers, one or more speakers, and an 802.3at power conversion module. Some of the described distribution systems include one or more Audio-streaming Source Units ("ASU") capable of streaming audio over an Ethernet network to the NSUs.

One aspect of this system is the ability of an Audio-streaming Source Unit ("ASU") to select an audio signal from any number of different possible sources, convert the selected audio signal to audio network packets that can be delivered (e.g., streamed) to one or more designated Network-powered Speaker Units ("NSU"). The audio inputs could be conventional analog audio signals from an audio component or microphone, digital audio signals such as S/PDIF from an audio component or digital microphone, existing audio packet streams accessible over a network such as Internet radio stations, or digitally encoded audio files accessible within the Audio-streaming Source Unit or over a network. The ASU can be capable of mixing two or more audio inputs together before converting to a network stream. The ASU can be capable of performing signal processing operations on the audio signals to increase perceived audio quality before converting to a network stream. The ASU can be capable of creating a number of network streams simultaneously each potentially with its own set of audio sources and with its own set of signal processing functions.

Another general aspect of this system is the ability of an NSU to be remotely directed to play out any of the audio streams on the network, whether those audio streams are streamed by an ASU or by some other device on the network. Each individual NSU can be directed to play out a different audio stream, or groups of Network-powered Speaker Units can be directed to play out the same audio stream. Each Network-powered Speaker Unit can be directed to play out at a different volume up to the limits of the DC power available to the NSU. Each NSU can be directed to mix two or more audio streams together to play out. Each NSU can be directed to apply different signal processing effects to the audio signal. Each NSU can be directed to convert microphone input samples to streaming audio network packets that can be delivered to a server in the network.

In some implementations the NSUs are comprised of a Power Management Subsystem, a Digital Processing Subsystem, a Speaker Amplifier Subsystem, and one or more speakers. The Power Management Subsystem converts the DC voltage supplied by the 802.3at source to DC voltage rails suitable for driving the Digital Processing Subsystem and the Speaker Amplifier Subsystem. A number of aspects of this implementation center around a coupling between the Digital Processing Subsystem and the Power Management Subsystem. It is advantageous for the Digital Processing Subsystem to draw as little power as possible and for the power conversion to be implemented as efficiently as possible so that more of the limited input power is available for driving the speakers. In some embodiments, there are separate, parallel power converters for the Digital Processing Subsystem and the Speaker Amplifier Subsystem rather than cascading the power converters which might reduce efficiency. In some such embodiments the Digital Processing Subsystem is used to provide the control signal for the Speaker Amplifier's power conversion system saving a switching regulator controller chip and its associated electronic components. The Digital Processing Subsystem estimates the power envelope of the audio signal to be played out thereby determining how much power the Speaker Amplifier Subsystem will need.

In the Power of Ethernet specification, IEEE 802.3at, there is a maximum amount of current that a Powered Device can draw over a window of time before the Power Source declares a fault and disconnects power. Accordingly, the NSU is prevented from exceeding these power limits. In some embodiments, the Digital Processing Subsystem uses its estimate of the power envelope of the audio signal to dynamically lower the volume level to avoid exceeding the power limit. In some embodiments, the ASU provides this function by limiting the volume at which the NSU is directed to play out.

Most conventional speakers are actually composed of two or more transducers, each with a corresponding frequency response range. A passive "crossover" network is incorporated in the speaker to split the input audio signal into separate signals for each transducer. For example, a speaker might be composed of a tweeter unit and a woofer unit, each unit having one or more transducers, where the transducers of the tweeter unit are more effective at high frequencies and the transducers of the woofer unit are more effective at low frequencies. The crossover network emphasizes high frequencies for the signal fed to the tweeter unit and emphasizes low frequencies for the signal fed to the woofer unit. In some embodiments of the NSU, the Digital Processing Subsystem uses digital filters to provide 2 different audio signals with tunable frequency emphasis. In some of these embodiments, the Speaker Amplifier Subsystem contains multiple amplifiers, one for each of the tunable audio signals. Such a system can drive two or more speakers (or transducers) without the need for a crossover network. For example, a first amplifier may provide audio signals for tweeter units and a second amplifier may provide an audio signal for woofer units. In some cases eliminating the crossover network components provides the space needed to fit the rest of the NSU components in the same form factor as an existing conventional speaker.

The audio processing capabilities of the Digital Processing Subsystem allow each NSU to implement a number of digital audio processing effects to maximize the perceived sound quality within the limits of the available power and speaker frequency response. Examples include Parametric Equalizer (PEQ) (see, for example, Equalization (audio)—Wikipedia, the free encyclopedia), Psychoacoustic Bass Enhancement (PBE) (see, for example, U.S. Pat. No. 5,930,373 A), Dynamic Bass Enhancement (DBE) or Dynamic Bass Boost (see, for example, U.S. Pat. No. 8,275,152 B2) and Dynamic Range Compression (DRC) (see, for example, Dynamic Range Compression—Wikipedia, the free encyclopedia).

Installation of NSUs can be made easier by being able to assign a unique identity to each NSU and to be able to determine that unique identity when in the proximity of that NSU. In some embodiments the NSU can be directed to play out a subliminal audio signal that encodes that unique identity. A control device such as a smart phone app can then receive and decode that signal to display the NSU identity.

The details of one or more examples are set forth in the accompanying drawings and the description below. Further features, aspects, and advantages are apparent in the description, the drawings, and the claims.

DETAILED DESCRIPTION

Figure 1:
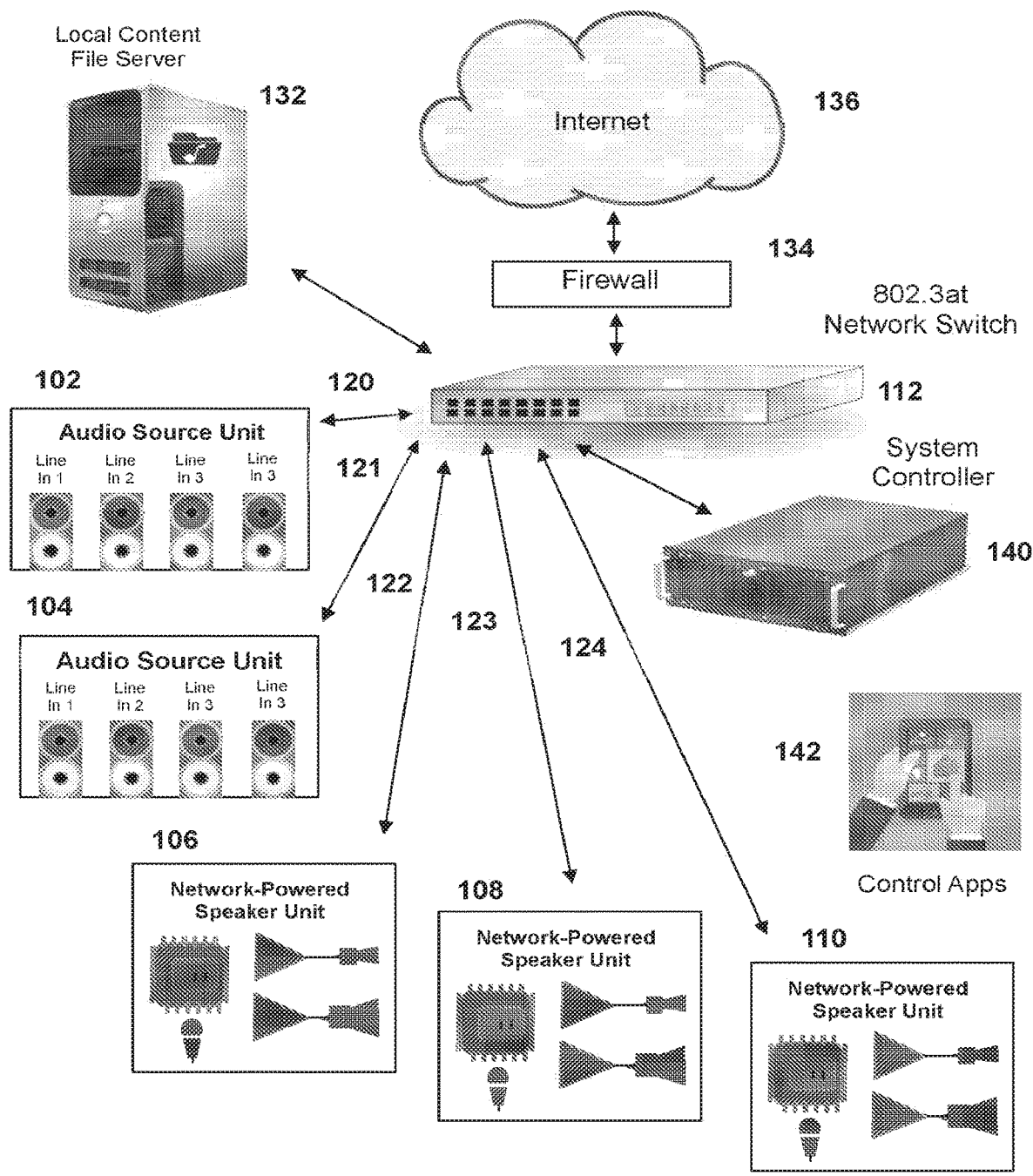
FIG. 1 illustrates an exemplary audio distribution system using only network cabling for audio distribution and powering of play-out devices.

FIG. 1 illustrates an exemplary audio distribution system. The audio distribution system includes Audio-streaming Source Units ("ASU") 102 and 104, Network-powered Speaker Units ("NSU") 106, 108 and 110, a 802.3at compliant network switch 112 and network links 120, 121, 122, 123 and 124. An ASU 102 has access to various sources of audio examples of which are a direct connection to one of the ASU input jacks 130, audio files stored on other network nodes such as file server 132 and Internet radio services accessible through a firewall 134 connected to the Public Internet 136. Computing devices attached to the same network such as system controller 140 or a conventional desktop computer, laptop computer or tablet, can direct ASU 102, for example, to create a network audio stream from one of the audio sources that ASU 102 has access to. The audio stream can be configured to have a unicast network destination address, that is a network address corresponding to the network address of one of NSUs 106, 108 or 110, or it can have a multicast network destination address which allows any or all NSUs to have access to that audio stream. The same or some other computing device attached to the network can direct NSU 106, for example, to receive an audio stream that has a destination address either corresponding to that NSU's network address or corresponding to some multicast address. Once the ASU 102 and NSU 106 pair are so configured the audio source will play out over the speaker or speakers contained in NSU 106. The NSUs 106, 108 and 110 receive their power from the network wiring according to the 802.3at specification and therefore have a connection only to network links 122, 123 and 124. Configuration and control of the audio distribution system can be done, for example, through human interaction with control application 142 that passes commands to system controller 140. Other means might be used to control the audio distribution either locally or remotely using direct human interaction or, for example, scripts triggered to run based on time of day.

Figure 2:
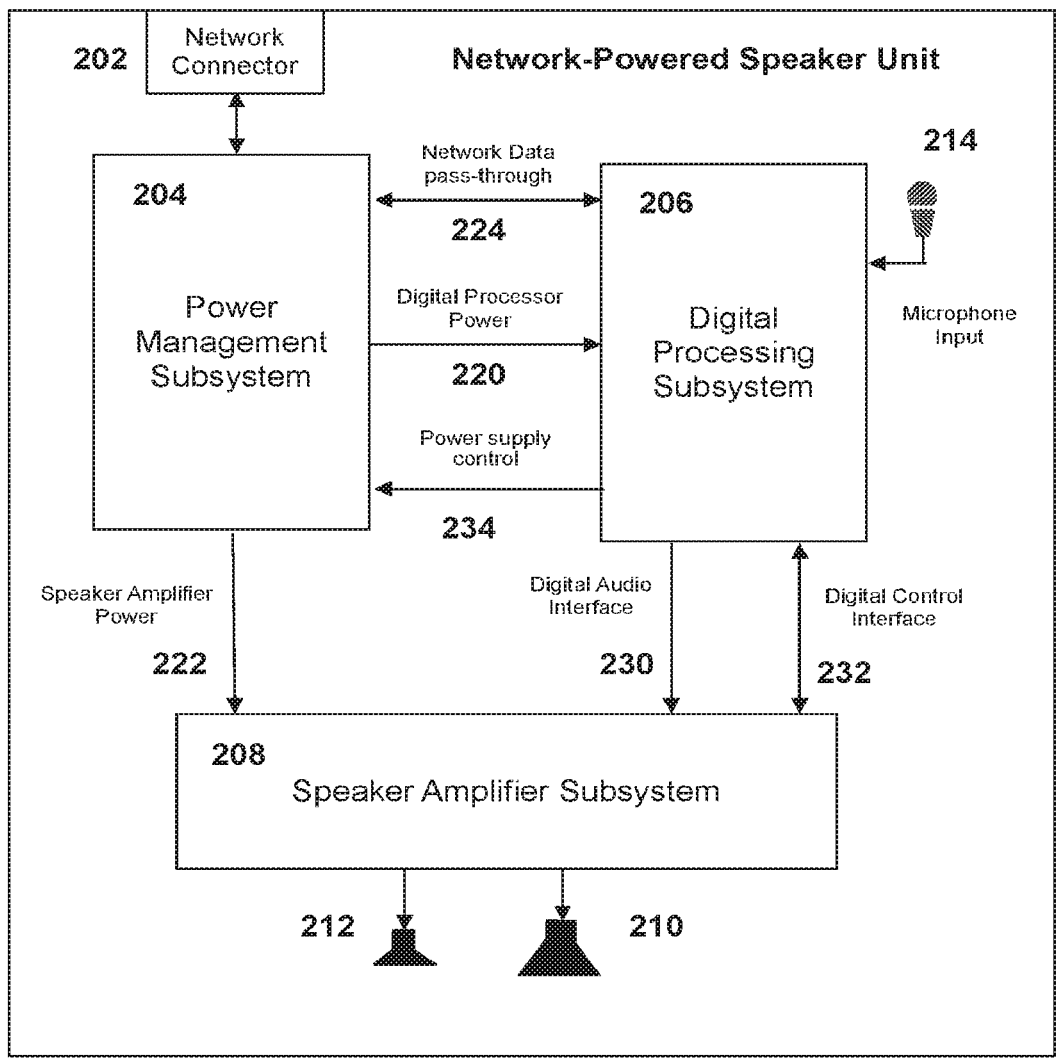
FIG. 2 illustrates functional blocks of a Network-powered Speaker Unit.

FIG. 2 illustrates an exemplary, high-level diagram of the implementation of a Network-powered Speaker Unit ("NSU"). The NSU includes network connection 202 which connects to a network cable such as a CAT5e cable, Power Management Subsystem 204, Digital Processing Subsystem 206, Speaker Amplifier Subsystem 208, woofer low-range speaker 210, tweeter high-range speaker 212 and microphone 214. Power Management Subsystem 204 has a means to pass the DC voltage from the network cable into at least 2 switching power supplies, one to generate power output 220 suitable for Digital Processing Subsystem 206 and one to generate power output 222 suitable for Speaker Amplifier subsystem 208. Power Management Subsystem 204 also has a means to pass the network data to Digital Processing Subsystem 206 through network data pass-through interface 224. Digital Processing Subsystem 206 has a means to convert a network audio stream to audio samples that can be passed to Speaker Amplifier Subsystem 208 through Digital Audio Interface 230. Digital Processing Subsystem 206 also has a means to receive network packets containing control information to configure its own internal properties and to configure the properties of Speaker Amplifier Subsystem 208 through Digital Control Interface 232. In some instantiations Digital Processing Subsystem 206 has a means to create a network audio stream from audio samples coming from microphone. In some instantiations Digital Processing Subsystem 206 has a means to control the regulation of the Speaker Amplifier Power through interface 234 that goes to Speaker Amplifier Subsystem 208.

Figure 3A:
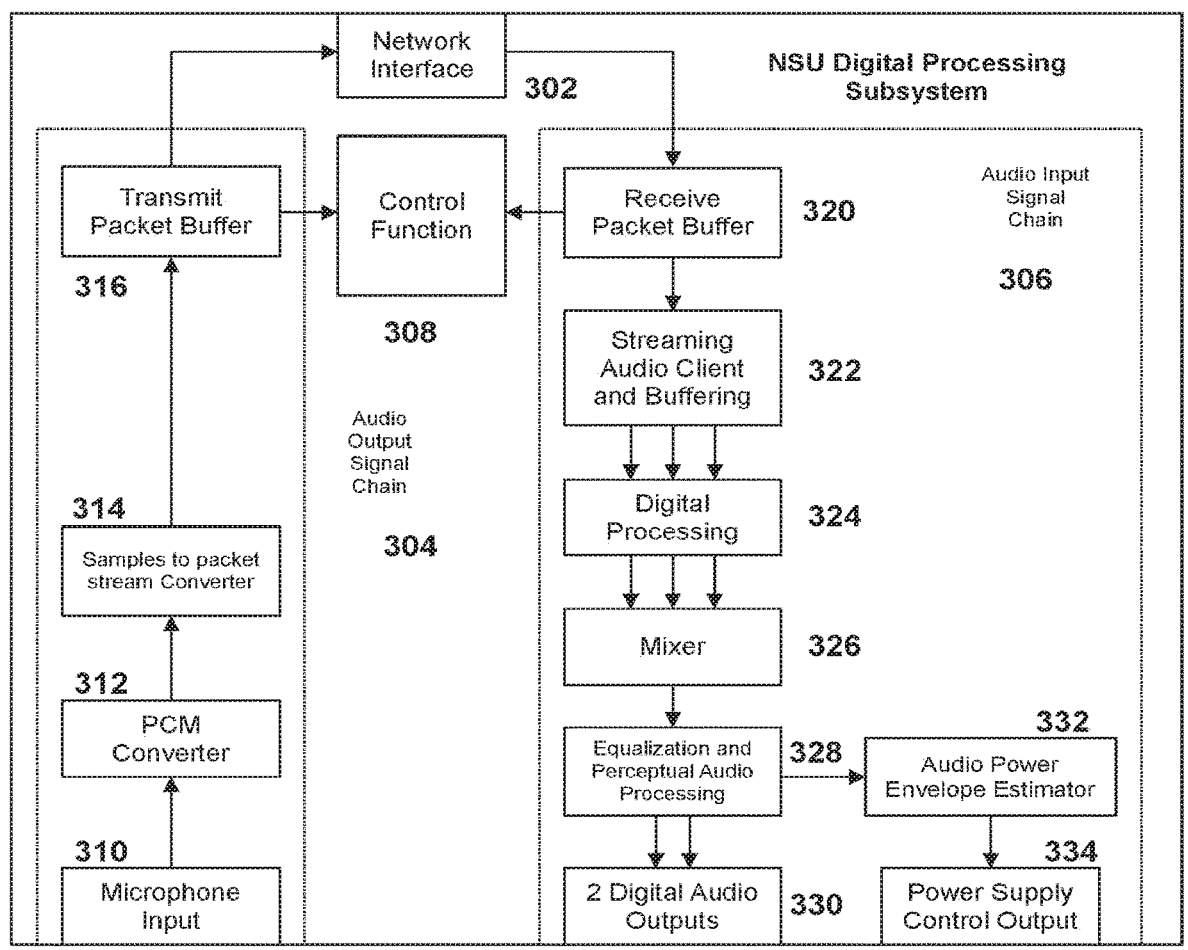
FIG. 3 illustrates functional blocks of the Digital Processing Subsystem of a Network-powered Speaker Unit.

FIG. 3A illustrates an exemplary functional diagram of the Digital Processing Subsystem of a Network-powered Speaker Unit. The Digital Processing Subsystem includes a Network Interface 302, an audio output signal chain 304, an audio input signal chain 306 and a control function 308. Network Interface 302 transmits and receives packets from and to packet buffers in the Digital Processing Subsystem memory. Audio output signal chain 304 converts microphone input samples to an audio packet stream for transmission to a voice processing function in the network. Audio output signal chain 304 comprises of a microphone input connector 310, a microphone audio to PCM audio sample converter 312, an audio sample to audio packet stream converter 314 and a transmit packet buffer 316 in the Digital Processing Subsystem memory. If an analog-output microphone is used, then the analog signal is converted to, for example, 24-bit samples of the microphone audio at a 48-kHz sample rate with a standard Analog-to-Digital converter. If a so-called digital microphone is used then the one-bit microphone audio signal is converted to, for example, 24-bit samples of the microphone audio at a 48-kHz sample rate with a digital decimation filter. Audio input signal chain 306 converts one or more audio packet streams to audio samples. Audio input signal chain 306 comprises of Receive Packet Buffer 320 in the Digital Processing Subsystem memory, a Streaming Audio Client 322 to convert audio packets from one or more network audio streams to audio samples, Digital Processing 324 of those audio samples which, for example, might be used to control the volume or change the sample rate of the audio samples from two or more separate streams to a common sample rate, a Mixer 326 to sum the audio samples from two or more streams into one audio signal, Equalization and Perceptual Audio Processing 328 such as, for example, low-range and high-range equalizers, Psychoacoustic Bass Enhancement ("PBE"), Dynamic Bass Enhancement ("DBE") or Dynamic Range Compression ("DRC"), two Digital Audio Output interfaces 330 (such as, for example, I2S or TDM), an Audio Power Envelope Estimator 332 which computes the power of the audio output signal and a Power Supply Control Output 334 which uses the Audio Power Envelope estimation to create, for example, a pulse-width modulated feedback signal for the speaker amplifier power supply. Control Function 308 sends and receives control information to and from computing devices on the network which control the whole audio distribution system. This control information might, for example, configure a list of network audio streams to receive, a separate volume level for each audio stream, a list of mixing coefficients for the audio signals, a list of perceptual signal processing effects to apply to the audio signal and a list of properties for the microphone input audio packet stream.

Figure 3B:
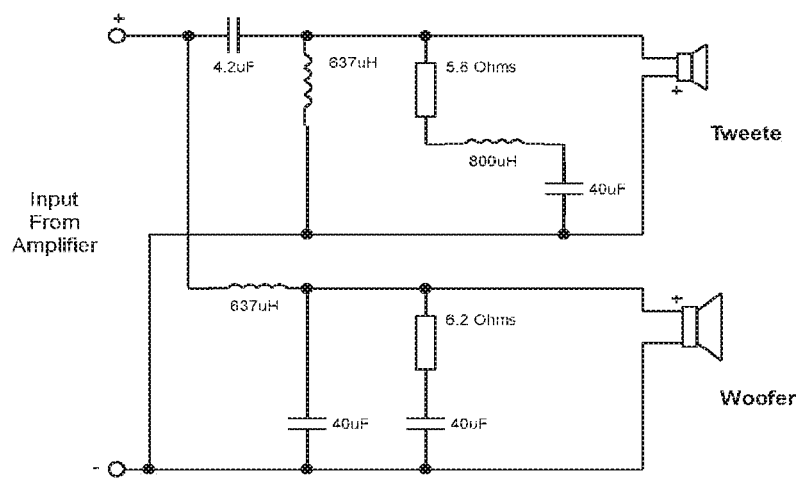

The low-range and high-range equalizers in Equalization and Perceptual Audio Processing block 328 can be used to eliminate the passive crossover networks that are built into many conventional speakers. A conventional speaker might comprise of a low-range woofer driver and a high-range tweeter driver mounted near each other in a speaker enclosure. This unit has a single audio input so some filtering is required to direct the low frequencies to the woofer driver and the high frequencies to the tweeter driver, and to compensate for driver intensity differences. FIG. 3B shows a schematic diagram of a pair of passive filters, one for each driver, that allows a single amplifier output to be connected to the pair of drivers. Such a network is called a crossover network. The equalizers in the NSU Digital Processing Subsystem can be configured to perform the same function as a crossover network so that the passive filters are not needed. This saves a lot of space because the inductors, capacitors and resistors used in crossover networks can be quite large.

An example application for these NSU features might be voice-selected play out of one of two sources of streaming music. A user has directed Streaming Audio Client 322 to receive two different streams of music simultaneously, playlist 1 and playlist 2. Playlist 1 is music samples digitized at a 44.1 kHZ sample rate and playlist 2 is music samples digitized at a 48 kHZ sample rate. Digital Processing block 324 converts playlist 1 to a 48 kHz sample rate and, because the user wishes to listen to only playlist 1, it applies a preselected volume level to playlist 1 and mutes playlist 2. Mixer 326 mixes the samples from playlist 1 and playlist 2 and passes those samples to Perceptual Audio Processing block 328 which enhances the bass energy in the audio samples to suit the user. Digital Audio Output block 330 clocks out the music samples to the Speaker Amplifier Subsystem. A voice command from the user is picked up at microphone input 310 and packets of the user's digitized voice samples are sent to a server. The server matches that voice command to a trigger phrase that request switching from playlist 1 to playlist 2. The server directs control function 308 to lower the volume of playlist 1 in steps and then raise the volume of playlist 2 in steps. The user speaks another voice command which the server matches to a trigger phrase to add more bass enhancement. The server directs control function 308 to add more bass enhancement through Perceptual Audio processing Block 328.

In order to aid in setting up an audio distribution system, Digital Processing Block 324 may have the capability to send a subliminal audio signal containing identifying information for that particular NSU. Information such as the assigned network address, or a device serial number could be encoded into a low-level spread spectrum signal that would not create an annoyance during the installation phase. Such a signal could be decoded by a smart phone app to show an installer the identifying information of the nearest NSU. One installation is complete a control signal from a server in the network could turn off this transmission.

Figure 4A:
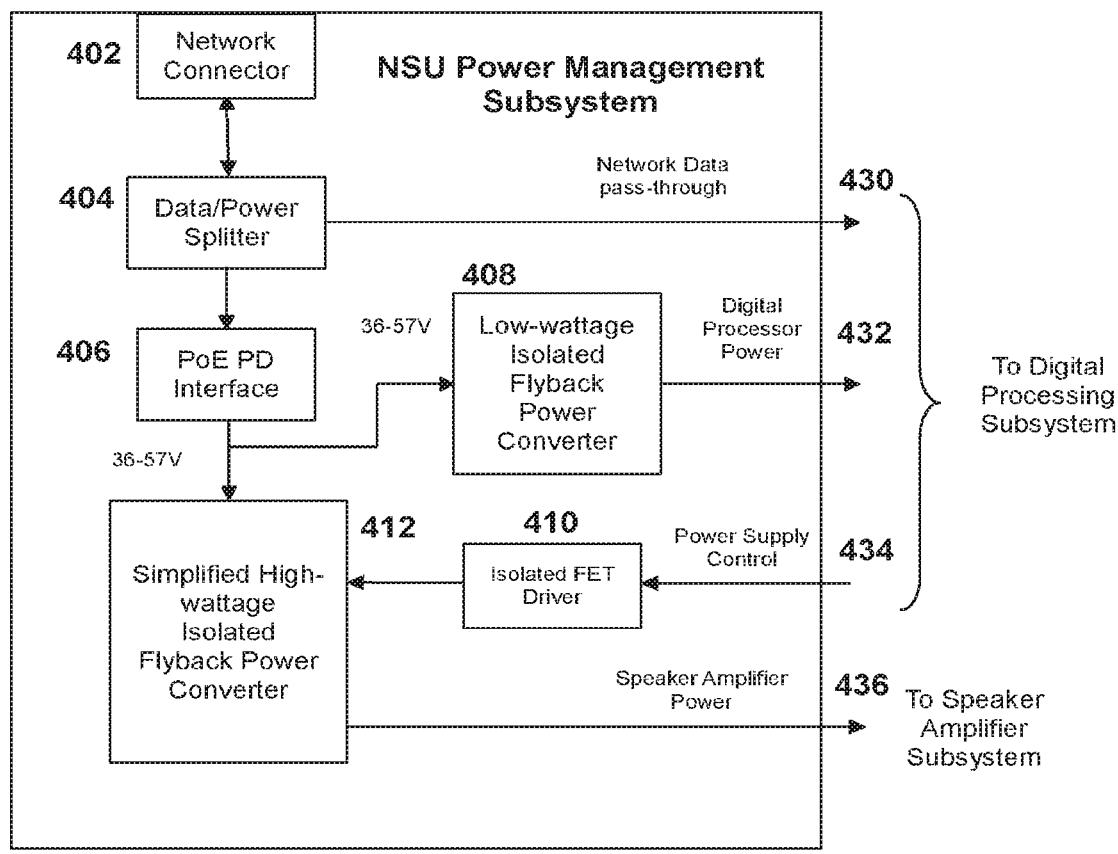
FIG. 4 illustrates functional blocks of the Power Management Subsystem of a Network-powered Speaker Unit.

FIG. 4A illustrates an exemplary functional diagram of the Power Management Subsystem of a Network-powered Speaker Unit. The Power Management Subsystem includes Network connector 402, Isolated Data/Power Splitter 404, Power over Ethernet ("PoE") Powered Device ("PD") Interface 406, Low-wattage Isolated Flyback Power Converter 408, Digital Isolator 410 and Simplified High-wattage Isolated Flyback Power Converter 412. The isolation from the network connection to the other NSU subsystems protects the speaker from any large voltage transients on the network cable. Data/Power Splitter 404 might comprise of, for example, a diode bridge to combine DC power from different cable pairs into a positive rail and a negative rail and an isolation transformer to route DC power to the diode bridge and network data to pass-through connection 430 going to the Digital Processing Subsystem. PoE PD Interface 406 performs a negotiation with an IEEE 802.3at compliant Ethernet Switch resulting in the Ethernet Switch turning on power to the NSU at which point PoE PD Interface 406 turns on a switch connecting power to Power Converters 408 and 412. Some embodiments use IEEE 802.3at "PoE+" or PoE plus; reference herein to PoE includes reference to the any version of PoE such as, but not limited to, PoE plus. Low-wattage Isolated Flyback Converter 408 is an efficient switch mode power supply that converts the 36 to 57 Volt PoE input voltage to, for example, 5 volts at 2.5 Watts for the Digital Processing Power connection 432. It uses a transformer in a flyback topology to achieve primary to secondary side isolation. Once the Digital Processing Subsystem is powered-up and active it generates Power Supply Control signal 434, for example a pulse-width modulated control signal, that passes through Isolated FET Driver 410 to drive High-wattage Isolated Flyback Power Converter 412. The output of High-wattage Power Converter 412 is, for example, 24 volts at 22.5 Watts for Speaker Amplifier Power connection 436. This power converter is greatly simplified by using a control signal from the Digital Processing Subsystem as described below.

Figure 4B:
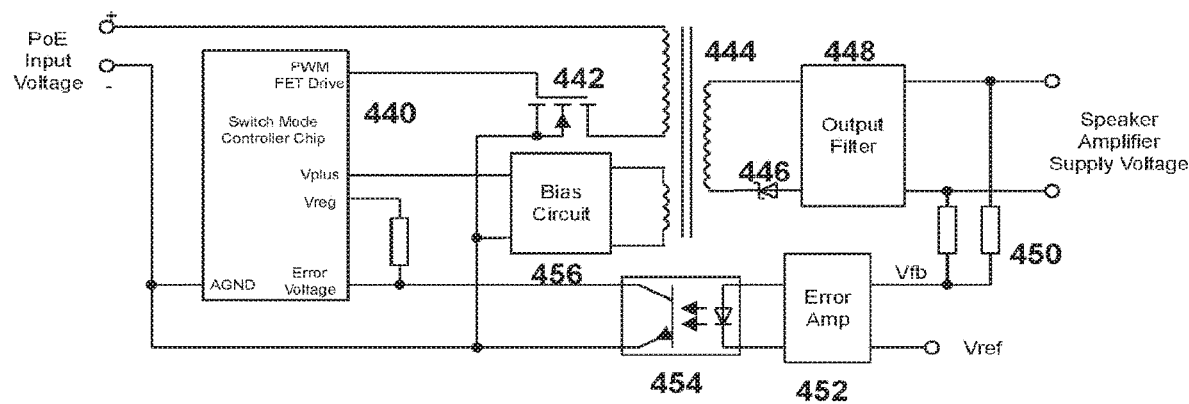

FIG. 4B shows a conventional, isolated switch mode power supply that could provide power for the Speaker Amplifier Subsystem. The heart of the system is Switch Mode Controller Chip 440. This chip generates a Pulse-width-modulated control signal to drive FET switch 442 which supplies current to transformer 444 when the switch is on. This causes current to flow in the isolated secondary winding which is then rectified by diode 446 and filtered by Output Filter 448 to produce the Speaker Amplifier Supply Voltage. The output voltage goes through voltage divider 450 generating feedback voltage Vfb which is compared with a reference voltage using Error Amplifier 452. Primary to secondary side isolation is maintained by optocoupler 454, which is an enclosure containing an LED and a semiconductor light sensor configured to detect light emitted from the LED. The optocoupler 454 causes a current to flow on the sensor side that is proportional to the optocoupler LED intensity, while isolating the electrical connection to the LED from the electrical connection to the sensor. That current flow generates the error voltage input to Switch Mode Controller Chip 440 allowing that chip to regulate the output voltage. A separate primary-side bias winding and bias circuit 456 is used to power Switch Mode Controller Chip 440.

Figure 4C:
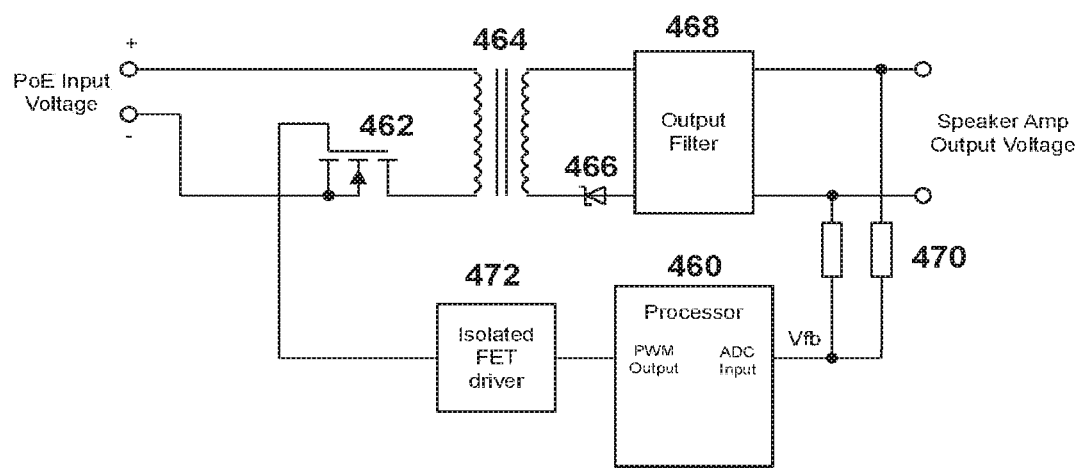

FIG. 4C shows an isolated switch mode power supply where the pulse-width-modulated control signal to drive FET switch 462 is generated by processor 460 which is at the heart of the Digital Processing Subsystem. It is assumed that the system processor has a built-in analog-to-digital converter ("ADC") peripheral and a built-in pulse-width modulator peripheral. Processor 460 generates a Pulse-width-modulated control signal to drive FET switch 462 which supplies current to transformer 464 when the switch is on. This causes current to flow in the isolated secondary winding which is then rectified by diode 466 and filtered by Output Filter 468 to produce the Speaker Amplifier Supply Voltage. The output voltage goes through voltage divider 470 generating feedback voltage Vfb. Vfb is connected to an ADC input of processor 460 to allow power supply control algorithms to measure the output voltage. Primary to secondary side isolation is maintained by isolated FET driver 472. In the general case the microprocessor's response time to load change would be too slow to have an acceptable transient response from this power supply. But there is some relationship between the power of the audio waveform being output to the Speaker Amplifier and the power supply load. The processor can model this relationship and update that model using long-term measurements of Vfb. By introducing a delay in the digital audio signal to the Speaker Amplifier the processor can anticipate the load change by measuring the power of the audio waveform and using its model to compute a PWM output to the FET switch at the same time that a load change happens.

FIGS. 4B and 4C illustrate the power supply circuit complexity reduction that can be achieved by using the processor in the Digital Processor Subsystem to control the power supply. Four parts of the conventional flyback switch mode power supply are eliminated. The Switch Mode Controller chip, the optocoupler, the Error Amplifier and the Bias Circuit are replaced by the already-available processor and an isolated FET driver circuit. In addition, there is no longer a need for a bias winding in the transformer. The space saved by not having a bias winding can be used to decrease the DC resistance of the transformer winding which will improve efficiency.

Figure 5:
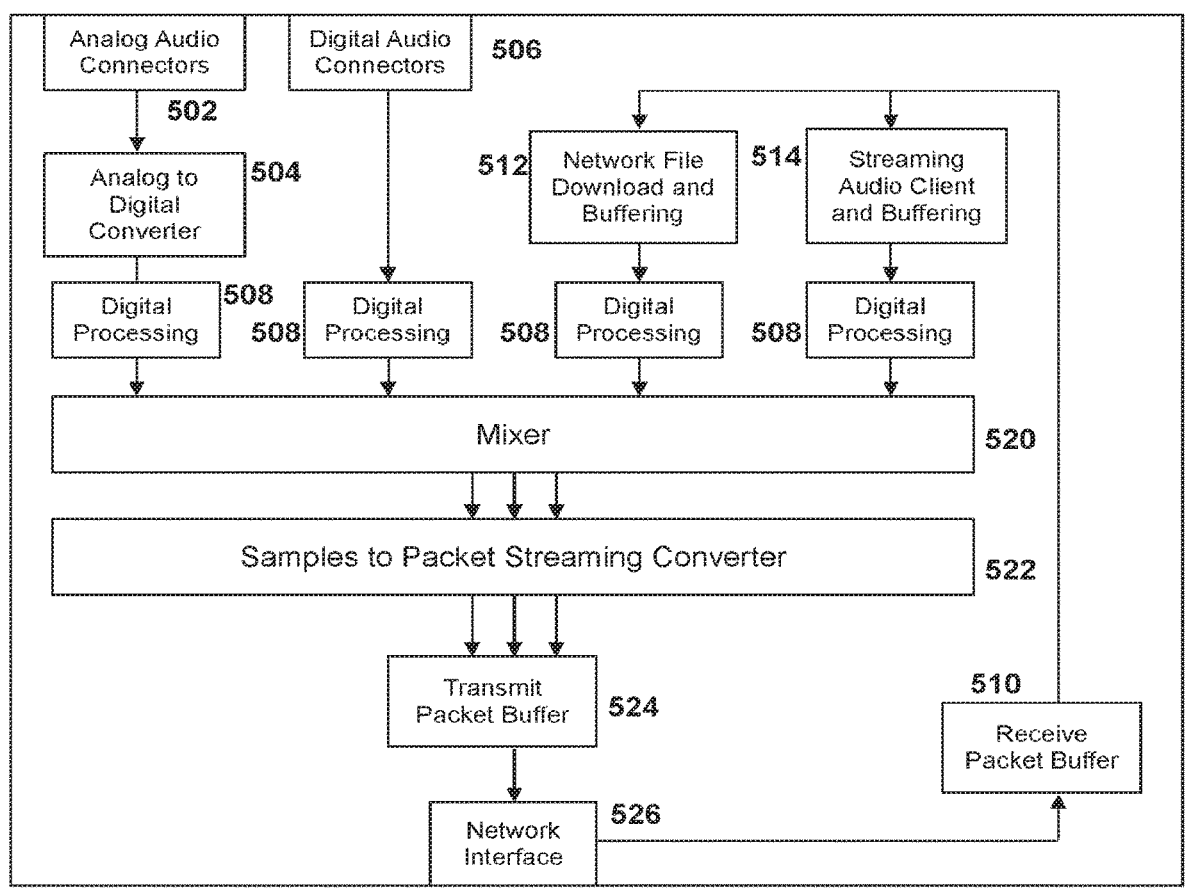
FIG. 5 illustrates functional blocks of an Audio-streaming Source Unit.

FIG. 5 illustrates an exemplary, high-level diagram of the implementation of a Audio-streaming Source Unit (ASU). The ASU includes one or more Analog Audio Input Connectors 502, an Analog to Digital Conversion section 504, one or more Digital Audio Input Connectors 506, Digital Processing sections 508, Receive Packet Buffer 510, Audio File Download component 512, Streaming Audio Client component 514, Mixer 520, Samples to Audio Packet Stream Converter 522, Transmit Packet Buffer 524 and Network Interface 526. The ASU has a number of audio sources that can be used to create a number of simultaneous packet streams. In this example audio sources 502, 506, 512 and 514 can be directed to simultaneously input audio samples to their corresponding Digital Processing 508 blocks. Digital Processing blocks 508 can be directed, for example, to adjust the volume and sample rate of the audio samples. Mixer 520 can be directed to combine any of the N simultaneous audio-sample inputs into M simultaneous, mixed audio sample outputs. Samples to Audio Packet stream converter 522 can be directed to create M audio packet streams, one for each output of Mixer 520. Finally, the M audio streams are transmitted onto the network through Transmit Packet Buffer 524 and Network Interface 526.

The ASU can be used to provide a "break-in" announcement over music application. To do so, two different external audio sources are connected to two Analog Audio Connectors 502. The analog to digital converters 504 convert the audio inputs to two digitized sample streams at a 48 kHz sample rate. In an example: User 1 has directed the ASU to play music source 1 over the speakers connected to NSUs in room 1 and user 2 has directed the ASU to play music source 2 over the speakers connected to NSUs in room 2. Digital processing block 508 adjusts the volume of the digital sample streams to suit each user's preferences. Mixer 520 selects only digital samples stream 1 to pass through to a first instance of streaming converter 522, which places the samples into network packets addressed to NSUs in room 1. Mixer 520 also selects only digital samples stream 2 to pass through to a second instance of streaming converter 522, which places the samples into network packets addressed to NSUs in room 2. The packets are transmitted out network interface 526 and are eventually played out to the speakers in room 1 and room 2. The ASU is then directed to break into each music stream with an announcement that is in the form of audio samples digitized at a 44.1 kHz sample rate and stored in a file on the network. Network File Download and Buffer block 512 downloads the audio samples into a buffer. Digital processing block 508 converts those samples to a 48 kHz sample rate with a preselected volume that will get the user's attention and Digital Processing block 508 decreases the music inputs' volume to a preselected lower level. Mixer 520 mixes the 48-kHz announcement samples with the digital samples of stream 1 and stream 2 so that network audio packets going to room 1 and room 2 now contain mixed music and announcement samples.

Another application is a karaoke application. A microphone with an S/PDIF output is connected to one of Digital Audio Connectors 506 and produces audio samples at 44.1 kHz. A user directs Streaming Audio Client 514 to play a karaoke tune from an Internet radio station encoded with a MP3 codec. The Digital Processing Block connected to the Streaming Audio Client converts encoded MP3 audio to unencoded audio samples at a 44.1 kHz sample rate. Mixer 520 mixes the Microphone samples with the radio station samples and passes them through to streaming converter 522, which places the samples into network packets addressed to NSUs in the room where user 1 is singing into the microphone.

Figure 6:
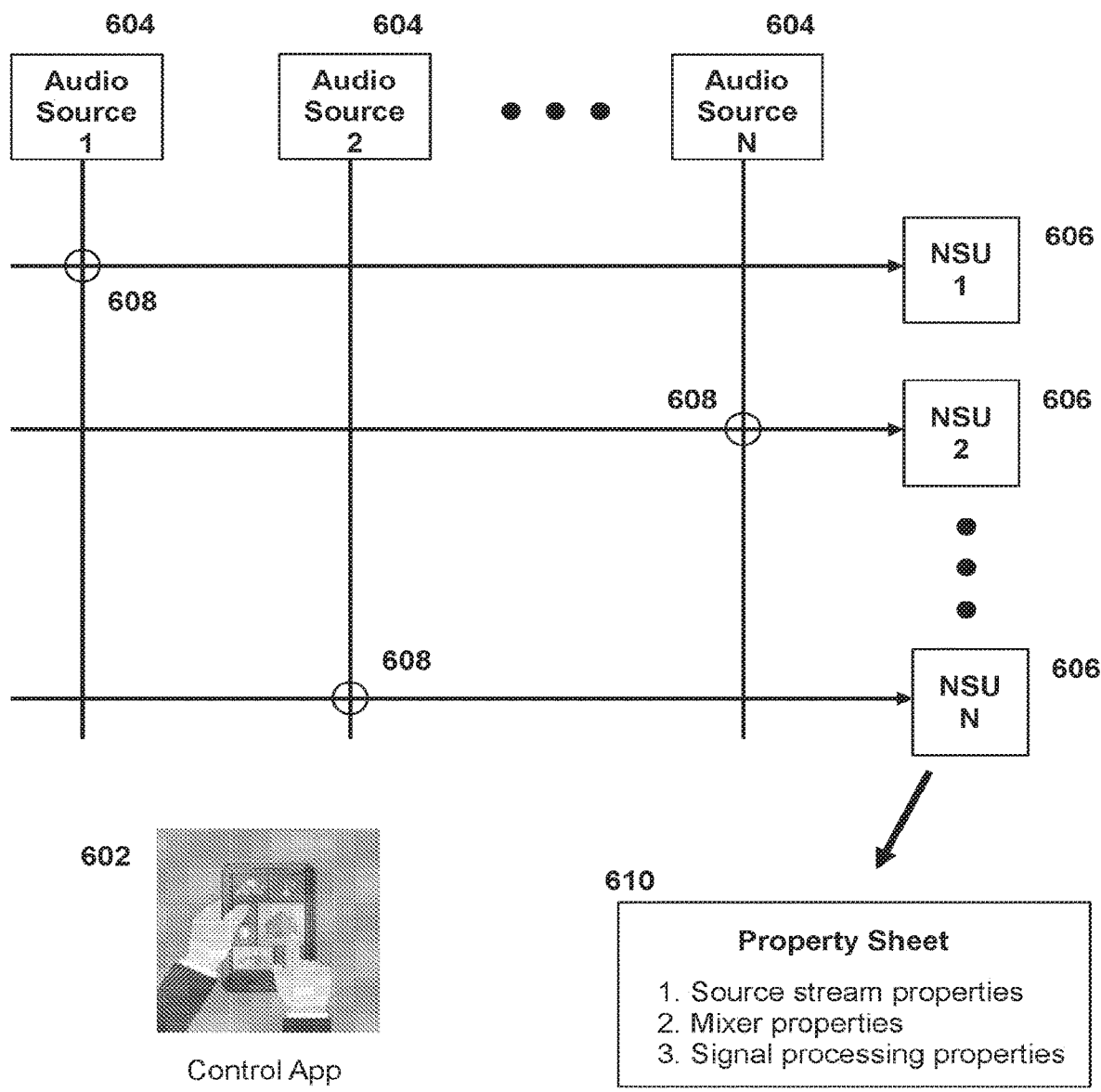
FIG. 6 illustrates the use of a remotely-located control capability unit to set up the sources and destinations of audio streams in the audio distribution network.

FIG. 6 illustrates an exemplary control style for the Audio Distribution System. A control application 602 shows a graphical diagram of the Audio Distribution System comprising of a matrix of Audio Sources 604, for example ASUs, Audio File Servers or Internet Audio Streams, and NSUs 606 where connections from one ASU to one NSU are represented by circles 608 placed at the matrix intersection point that designates the connection. For any ASU or NSU Control Application 602, can display a property Sheet 610 that allows access to all of the ASU or NSU configuration options and actions that were detailed in the functional block diagram descriptions.

Centralized control of all aspects of the audio distribution system is enabled by using the packet network both for directing audio streams between ASU and NSU devices and to transmit control function packets from a central control server to the ASU and NSU devices. Control function packets might contain, for example, a command word followed by a number of parameters.

The following list is an example of commands that may be sent from the central control function to the NSUs:
1. Receive Audio Stream (stream number, stream identifier)
2. Change Volume (stream number, volume step size)
3. Change Sample Rate (stream number, target sample rate)
4. Mix Streams (list of stream numbers to mix)
5. Apply Equalization Function (equalization function identifier)
6. Apply Audio Processing Function (Audio Processing Function Identifier)
7. Transmit Microphone Audio Stream (stream parameters)

The following list is an example of commands that may be sent from the central control function to the ASUs:
1. Receive Analog Audio Input (input number, sample rate, input volume)
2. Receive Digital Audio Input (input number, clock rate, input volume)
3. Receive File Data (URL of file, sample rate, input volume)
4. Receive Network Stream (URL of stream, sample rate, input volume)
5. Mix inputs (list of input numbers to mix, output number)
6. Transmit Audio Stream (mixer output number, stream parameters)

Accordingly, as has been described herein, an audio distribution system can be set up using only conventional network cabling for the purpose of distributing audio from one or more devices, hereafter referred to as Audio-streaming Source Units ("ASU"), to one or more self-contained play-out devices capable of playing out audio to loudspeakers, hereafter referred to as Network-powered Speaker Units ("NSU"). The Audio-streaming Source Units can provide a connection to sources of audio samples. The Audio-streaming Source Units can directly connect to one or more analog audio sources and/or one or more digital audio sources. The Audio-streaming Source Units can re-sample one or more connected digital audio sources in order to stream all digital audio with a common sample timing. An Audio-streaming Source Unit can be remotely directed to convert any audio input to a network audio stream. An Audio-streaming Source Unit can be remotely directed to mix audio from two or more inputs and convert that audio to a network audio stream. An Audio-streaming Source Unit can be remotely directed to connect to and stream Internet radio services to the local network. An Audio-streaming Source Unit can be remotely directed to fetch audio files stored on other devices on the network and convert that audio to a network audio stream. A Network-powered Speaker Units are powered through the network cabling. The Network-powered Speaker Units are powered by an IEEE 802.3at compliant network. The Network-powered Speaker Units can be directed to play out audio streams received over the network cable, whether those audio streams are created by an Audio-streaming Source Unit or by some other device on the network. A Network-powered Speaker Unit can be remotely directed to play out particular audio streams received over the network cable. A Network-powered Speaker Unit can be remotely directed to play out audio mixed from two or more separate network audio streams. A Network-powered Speaker Unit can be remotely directed to connect to and play Internet radio services. A Network-powered Speaker Unit can be remotely directed to fetch and play audio files stored on other devices on the network.

Described herein is a self-contained network audio play-out device, referred to as a Network-powered Speaker Unit ("NSU"), which receives streaming audio and power from the same network cable. An NSU containing a Power Management Subsystem capable of providing all necessary power for the NSU from an IEEE 802.3at ("PoE") compliant network link, containing a Digital Processing Subsystem capable of receiving one or more audio streams from the network and mixing those streams together and containing a Speaker Amplifier Subsystem that can drive one or more speakers.

Described herein is an NSU where the Power Management Subsystem contains an isolation barrier so that the network cable is electrically isolated from the speakers in the NSU; an NSU with the capability to directly drive two or more speakers with different frequency responses using only digital filtering for the range separation; an NSU with the capability to be remotely directed to emit a unique, subliminal audio signal that can be decoded by a device such as a smart phone in proximity to that NSU, for the purpose of uniquely identifying each NSU; an NSU where the Digital Processing Subsystem contains a microprocessor for network communications, playing out streaming audio and controlling the speaker amplifier power supply; an NSU where the microprocessor has a means to measure the power envelope of played-out audio and has circuitry to allow this measured power envelope to regulate the speaker amplifier DC voltage level; an NSU where the speaker amplifier DC voltage level is regulated using a pulse-width modulator output of the microprocessor; and an NSU where the Speaker Amplifier Subsystem is a class-D speaker amplifier with the audio input coming from a pulse-width modulator output of the microprocessor.

Described herein is an NSU with a built-in microphone and the capability to create streaming audio packets from the microphone input and direct those packets to a device in the network. An audio distribution system where all aspects of the audio distribution system can be controlled by sending network packets with control information to the devices in the system. An audio distribution system where all aspects of the audio distribution system can be controlled by a user with a graphical interface or with voice commands. An audio distribution system where voice input for the purpose of controlling the system can come from one or more NSUs in the system.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, C, C++, C #, Python, Ruby, PROLOG, or in any byte code language such as JAVA. The software programs may be stored on or in one or more articles of manufacture as object code. The article of manufacture stores this data in a non-transitory form.

While this specification contains many specific implementation details, these descriptions are of features specific to various particular implementations and should not be construed as limiting. Certain features described in the context of separate implementations can also be implemented in a unified combination. Additionally, many features described in the context of a single implementation can also be implemented separately or in various sub-combinations. Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms. Likewise, references to "and/or" may be construed as an explicit use of the inclusive "or." The labels "first," "second," "third," and so forth are not necessarily meant to indicate an ordering and are generally used merely as labels to distinguish between like or similar items or elements.

Having described certain implementations and embodiments of methods and systems, it will now become apparent to one of skill in the art that other embodiments incorporating the concepts of the disclosure may be used. Therefore, the disclosure should not be limited to certain implementations or embodiments, but rather should be limited only by the spirit and scope of the following claims.

What is claimed is:

1. A network-powered speaker unit ("NSU"), comprising:
a power management subsystem, including at least a control signal input to dynamically set an output voltage level;
a digital processing subsystem including at least a control signal output to the power management subsystem, the control signal output value being derived from the measured power envelope of a digital audio signal;
a network interface coupled to the power management subsystem and coupled to a data pass-through to the digital processing subsystem, the power management subsystem configured to draw electrical energy from a network cable connected to the network interface, and the digital processing subsystem configured to receive a digital audio stream transmission via the network interface and the data pass-through to pass the digital audio stream to the digital processing subsystem; and an amplifier powered by electrical energy with a dynamically set output voltage level from the power management subsystem and configured to use the electrical energy to amplify the digital audio signal driving one or more audio transducers to produce audio.

2. The NSU of claim 1, wherein the NSU further comprises a connector for an audio input source that is one of:
an analog audio source;
a digital audio source;
audio files stored on a device on the network;
a packet audio source;
a network audio source;
an "Internet Radio" stream; or
a microphone.

3. The NSU of claim 1, wherein the NSU further comprises a mixer configured to combine multiple audio sources into a single digital audio stream transmission.

4. The NSU of claim 1, further comprising a control interface for controlling the digital audio stream transmission.

5. The NSU of claim 4, wherein the control interface receives control instructions from a client device via the network interface.

6. The NSU of claim 1, further comprising the one or more audio transducers.

7. The NSU of claim 1, wherein the power management subsystem is capable of providing all necessary power for the NSU from an IEEE 802.3at compliant network link.

8. The NSU of claim 1, wherein the power management subsystem includes an isolation barrier electrically isolating the network cable from the amplifier in the NSU.

9. The NSU of claim 1, wherein the NSU further comprises a microphone, and is configured to be controlled via voice commands.

10. A network-powered speaker unit ("NSU"), comprising:
a power management subsystem;
a digital processing subsystem;
a network interface coupled to the power management subsystem and coupled to a data pass-through to the digital processing subsystem, the power management subsystem configured to draw electrical energy from a network cable connected to the network interface, and the digital processing subsystem configured to receive a digital audio stream transmission via the network interface and the data pass-through to couple the digital audio stream to the digital processing subsystem; and
an amplifier powered by electrical energy from the power management subsystem and configured to use the electrical energy to amplify a digital audio signal from the digital processing subsystem to directly drive two or more audio transducers with different frequency responses using only digital filtering for range separation.

11. The NSU of claim 10, wherein the NSU further comprises a connector for an audio input source that is one of:
an analog audio source;
a digital audio source;
audio files stored on a device on the network;
a packet audio source;
a network audio source;
an "Internet Radio" stream; or
a microphone.

12. The NSU of claim 10, wherein the NSU further comprises a mixer configured to combine multiple audio sources into a single digital audio stream transmission.

13. The NSU of claim 10, further comprising a control interface for controlling the digital audio stream transmission.

14. The NSU of claim 13, wherein the control interface receives control instructions from a client device via the network interface.

15. The NSU of claim 10, further comprising the two or more audio transducers.

16. The NSU of claim 10, wherein the power management subsystem is capable of providing all necessary power for the NSU from an IEEE 802.3at compliant network link.

17. The NSU of claim 10, wherein the power management subsystem includes an isolation barrier electrically isolating the network cable from the amplifier in the NSU.

18. The NSU of claim 10, wherein the NSU further comprises a microphone, and is configured to be controlled via voice commands.

19. A system comprising one or more network-powered speaker units ("NSUs"), each NSU comprising:
a power management subsystem;
a digital processing subsystem;
a network interface coupled to the power management subsystem and coupled to a data pass-through to the digital processing subsystem, the power management subsystem configured to draw electrical energy from a network cable connected to the network interface, and the digital processing subsystem configured to receive a digital audio stream transmission via the network interface and the data pass-through to couple the digital audio stream to the digital processing subsystem; and
an amplifier powered by electrical energy from the power management subsystem and configured to use the electrical energy to amplify a digital audio signal from the digital processing subsystem to directly drive one or more audio transducers to produce audio;
wherein each NSU of the one or more NSUs is configured to emit a unique audio signal for decoding by a device in proximity to the respective NSU, uniquely identifying the respective NSU.

20. The system of claim 19, wherein each NSU of the one or more NSUs further comprises a connector for an audio input source that is one of:
an analog audio source;
a digital audio source;
audio files stored on a device on the network;
a packet audio source;
a network audio source;
an "Internet Radio" stream; or
a microphone.

21. The system of claim 19, wherein each NSU of the one or more NSUs further comprises a mixer configured to combine multiple audio sources into a single digital audio stream transmission.

22. The system of claim 19, wherein each NSU of the one or more NSUs further comprises a control interface for controlling the digital audio stream transmission.

23. The system of claim 22, wherein the control interface of each NSU of the one or more NSUs receives control instructions from a client device via the network interface.

24. The system of claim 19, wherein each NSU of the one or more NSUs further comprises the one or more audio transducers.

25. The system of claim 19, wherein the power management subsystem of each NSU is capable of providing all necessary power for the respective NSU from an IEEE 802.3at compliant network link.

26. The system of claim 19, wherein the power management subsystem of each NSU includes an isolation barrier electrically isolating the network cable from the amplifier in the respective NSU.

27. The system of claim 19, wherein each NSU of the one or more NSUs further comprises a microphone, and is configured to be controlled via voice commands.

\* \* \* \* \*